(12) United States Patent  
Domey et al.

(10) Patent No.: US 8,915,745 B2
(45) Date of Patent: *Dec. 23, 2014

(54) METHOD AND APPARATUS FOR FORMING A WRITABLE ERASABLE AREA ON AN OBJECT

(71) Applicant: Corning Incorporated, Corning, NY (US)

(72) Inventors: Jeffrey John Domey, Elmira, NY (US); Matthew Wade Fenton, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,287

(22) Filed: Sep. 12, 2013

(65) Prior Publication Data

US 2014/0017441 A1    Jan. 16, 2014

Related U.S. Application Data

(63) Continuation of application No. 13/280,921, filed on Oct. 25, 2011, now Pat. No. 8,556,637.

(51) Int. Cl.
*B43L 1/00*     (2006.01)
*B43L 1/08*     (2006.01)
*C03C 3/091*    (2006.01)
*C03C 21/00*    (2006.01)

(52) U.S. Cl.
CPC . *B43L 1/00* (2013.01); *B43L 1/008* (2013.01); *B43L 1/08* (2013.01); *C03C 3/091* (2013.01); *C03C 21/002* (2013.01)
USPC ........................................................ 434/408

(58) Field of Classification Search
USPC .......... 434/81, 82, 84, 85, 88, 408, 413, 421, 434/428, 430; 65/273, 275, 285, 287
See application file for complete search history.

(56) References Cited

U.S. PATENT DOCUMENTS

| 3,803,762 A | 4/1974 | Abeel et al. ................. 49/34 |
| 3,822,122 A | 7/1974 | Plumat et al. ............... 65/30 |
| 4,483,700 A | 11/1984 | Forker, Jr. et al. ........ 65/30.14 |

(Continued)

FOREIGN PATENT DOCUMENTS

| GB | 1021497 | 3/1966 | |
| GB | 1267865 | 3/1972 | ............... C03C 3/00 |
| GB | 2226590 | 7/1990 | ............... E06B 3/66 |
| KR | 2010117919 | 11/2010 | |

OTHER PUBLICATIONS

International Search Report and Written Opinion, International Application No. PCT/US2012/061408, Dated Feb. 11, 2013.

*Primary Examiner* — Kurt Fernstrom
(74) *Attorney, Agent, or Firm* — Ryan T. Hardee

(57) ABSTRACT

A method of forming a writable erasable area on an object includes selecting a glass sheet having a front surface and a back surface, where the front surface is opposed to and parallel to the back surface. An area of the object where the writable erasable area is to be located is selected. The selected area has a select non-flat shape. The shape of the glass sheet is conformed to the select non-flat shape. The glass sheet is then mounted on the object such that the glass sheet is located at the selected area of the object and conforms in shape to the selected area of the object.

20 Claims, 6 Drawing Sheets

(56) References Cited

U.S. PATENT DOCUMENTS

| | | | |
|---|---|---|---|
| 5,674,790 A | 10/1997 | Araujo | 501/66 |
| 6,308,446 B1 | 10/2001 | Healy | 40/600 |
| 6,506,058 B1 | 1/2003 | Frances | 434/408 |
| 6,945,785 B2 | 9/2005 | Sohl et al. | 434/408 |
| 7,354,273 B2 | 4/2008 | Donelan | 434/408 |
| 7,665,810 B2 | 2/2010 | Crompton et al. | 312/204 |
| 7,666,511 B2 | 2/2010 | Ellison et al. | 428/426 |
| 8,308,483 B2 | 11/2012 | Hume | 434/81 |
| 2006/0073466 A1 | 4/2006 | Solomon | 434/408 |
| 2006/0158621 A1 | 7/2006 | Kirchhoff | 353/119 |
| 2008/0042537 A1 | 2/2008 | Kim et al. | 312/405 |
| 2008/0070228 A1 | 3/2008 | Gerules | 434/408 |
| 2009/0068632 A1 | 3/2009 | Thompson et al. | 434/416 |
| 2010/0171929 A1 | 7/2010 | Liu et al. | 353/29 |
| 2011/0045961 A1 | 2/2011 | Dejneka et al. | 501/66 |
| 2011/0075240 A1 | 3/2011 | Tsai | 359/242 |
| 2011/0091860 A1 | 4/2011 | Supera | 434/409 |

METHOD AND APPARATUS FOR FORMING A WRITABLE ERASABLE AREA ON AN OBJECT

CROSS REFERENCE TO RELATED APPLICATIONS

This application is a continuation application of and claims the priority benefit of U.S. patent application Ser. No. 13/280,921, filed on Oct. 25, 2011, the content of which is relied upon and incorporated herein by reference in its entirety.

BACKGROUND

The present invention relates generally to writable erasable marker boards for writing or drawing. More specifically, the present invention relates to a method and an apparatus for providing a writable erasable area on faces of objects without spoiling the appearances of these faces. Examples of these objects are household appliances, such as a refrigerator, pieces of furniture, such as a cabinet or console, and architectural elements, such as a facade. These objects are typically expected to be aesthetically pleasing to the eyes while being also functional.

A number of writeable erasable marker boards are described in the patent literature. For example, US 2011/091860 (Supera et al.; 21 Apr. 2011) discloses a magnetic glass dry erase board that includes a glass sheet, a metal sheet, and an adhesive layer attaching the metal sheet to the glass sheet. The glass sheet is fabricated from low iron glass and may be fabricated from tempered glass. The metal sheet may be at least partially covered with a coating, and the coating may be visible through the glass sheet to provide a background color that enhances the visibility of text or drawings placed on the magnetic glass dry erase board. The metal sheet enables objects to be removably mounted on the magnetic dry erase board using magnets.

US 2006/073466 (Solomon; 6 Apr. 2006) discloses a glass dry-erase board that includes a tempered glass sheet having a smooth surface and a frosted surface. A layer of opaque white paint is painted on the frosted surface. The paint layer and frosted surface provide a non-image-reflecting or non-specular background and relative sharp contrast background for writing. The glass dry-erase board can be mounted on the wall using spaced hook or picture hangers.

CN 2542455Y (2 Apr. 2003) discloses a word board that includes a transparent glass board. The back of the glass board body is coated with a white paint or pasted with a white paper layer. The board body can also be formed by uniting two layers of thinner transparent glass boards and a white paper layer that is clipped in the middle to one of the glass board layers.

SUMMARY

In a first aspect of the present invention, a method of forming a writable erasable area on an object includes selecting a glass sheet having a front surface and a back surface, where the front surface is opposed to and parallel to the back surface. The method includes selecting an area of the object where the writable erasable area is to be located. The selected area has a select non-flat shape. The method includes conforming a shape of the glass sheet to the select non-flat shape. The method further includes mounting the glass sheet on the object such that the glass sheet is located at the selected area of the object and conforms in shape to the selected area of the object.

In one embodiment, the step of selecting the glass sheet includes selecting the glass sheet having a thickness less than 2.0 mm.

In one embodiment, the step of selecting the glass sheet includes selecting the glass sheet having a thickness less than 1.0 mm.

In one embodiment, the step of selecting the glass sheet includes selecting the glass sheet having a thickness less than 2.0 mm and a surface compression strength of at least 300 MPa.

In one embodiment, the step of selecting the glass sheet includes selecting the glass sheet having a compressively-stressed region near at least one of its front and back surfaces, where the compressively-stressed region has a layer depth of at least 20 microns.

In one embodiment, the method of forming the writable erasable area on the object further includes selecting a mounting means from the group consisting of (i) a magnetic layer applied on the back surface of the glass sheet, (ii) an adhesive applied on the back surface of the glass sheet, and (iii) a static cling layer applied on the back surface of the glass sheet. The selected mounting means is used to mount the glass sheet on the object.

In one embodiment, the method of forming the writable erasable area on the object further includes selecting a mounting means from the group consisting of (i) one or more mounting holes in the glass sheet and one or more fasteners insertable in the mounting holes and object, (ii) one or more glass sheet hanging elements attachable to the glass sheet and object, and (iii) one or more glass sheet framing elements attaching to the glass sheet and object. The selected mounting means is used to mount the glass sheet on the object.

In one embodiment, the method of forming the writable erasable area on the object further includes placing a decoration on or adjacent to the back surface of the glass sheet, where the decoration is visible through the front surface of the glass sheet.

In one embodiment, the step of conforming the shape of the glass sheet to the select non-flat shape includes elastically deforming the glass sheet into the select shape, and the step of mounting the glass sheet comprises retaining the glass sheet in the select non-flat shape.

In one embodiment, the step of conforming the shape of the glass sheet to the select non-flat shape includes pre-forming the glass sheet into the select non-flat shape, where the glass sheet retains the select non-flat shape without an external aid or retainer.

In one embodiment, the method of forming the writable erasable area on the object further includes selecting the object from the group consisting of a household appliance, a piece of furniture, an architectural element, and a non-glass board.

In a second aspect of the present invention, a method of making a conformable writable erasable device includes selecting a glass sheet having a thickness less than 2.0 mm, a front surface, and a back surface, where the front surface is opposed and parallel to the back surface. The method includes forming the glass sheet into a select shape. The method includes forming at least one compressively-stressed region in a surface of the glass sheet, where the at least one compressively-stressed region has a compressive stress of at least 300 MPa. The method includes providing the glass sheet with mounting means such that when the glass sheet is mounted on the object using the mounting means the front surface of the glass sheet is accessible and usable as the writable erasable area.

In one embodiment, the method of making a conformable writable erasable device further includes selecting an area of the object where the glass sheet is to be located. In the step of forming the glass sheet into the select non-flat shape, the select non-flat shape of the glass sheet conforms to a shape of the selected area of the object.

In one embodiment, the selected area of the object is curved.

In one embodiment, the object on which the glass sheet would be mounted is selected from the group consisting of a household appliance, a piece of furniture, an architectural element, and a non-glass board.

In one embodiment, the step of providing the glass sheet with mounting means includes at least one of (i) providing a magnetic layer on the back surface of the glass sheet, (ii) providing an adhesive layer on the back surface of the glass sheet, and (iii) providing a static cling layer on the back surface of the glass sheet.

In another embodiment, the step of providing the glass sheet with mounting means includes at least one of (i) forming one or more mounting holes in the glass sheet, (ii) attaching one or more glass sheet hanging elements to the glass sheet, and (iii) attaching one or more glass sheet framing elements to the glass sheet.

In one embodiment, the step of forming the glass sheet comprises elastically deforming the glass sheet into the select non-flat shape.

In one embodiment, the step of providing the glass sheet with mounting means includes retaining the glass sheet in the select non-flat shape using the mounting means.

In one embodiment, the method of forming the glass sheet includes pre-forming the glass sheet into the select non-flat shape, wherein the glass sheet retains the select non-flat shape without an external aid or retainer.

In one embodiment, the method of making a conformable writable erasable device further includes placing a decoration on or adjacent to a back surface of the glass sheet, wherein the decoration is visible through the front surface.

In one embodiment, the step of forming at least one compressively-stressed region in a surface of the glass sheet includes forming the at least one compressively-stressed region to a layer depth of at least 20 microns.

In one embodiment, the step of selecting the glass sheet includes selecting the glass sheet having a thickness less than 1.0 mm.

In one embodiment, the step of selecting the glass sheet includes selecting the glass sheet having a thickness less than 0.7 mm.

In one embodiment, the step of forming at least one compressively-stressed region comprises subjecting the glass sheet to a chemical strengthening process.

In a third aspect of the present invention, a conformable writable erasable device includes a conformable glass sheet having a front surface and a back surface. The front surface is opposed and parallel to the back surface. The conformable glass sheet is conformable to a select non-flat shape. The conformable writable erasable device further includes mounting means for mounting the conformable glass sheet on an object such that when the conformable glass sheet is mounted on the object using the mounting means the conformable glass sheet is located at and conforms in shape to a selected area of the object having the select non-flat shape.

In one embodiment, the conformable glass sheet has a thickness less than 2 0 mm and a surface compressive strength of at least 300 MPa.

In one embodiment, the conformable glass sheet has at least one compressively-stressed region near its front surface or back surface, where the compressively-stressed region has a layer depth of at least 20 microns.

In one embodiment, the conformable glass sheet has a thickness that is selected from the group consisting of less than 2.0 mm, less than 1.0 mm, and less than 0.7 mm.

In one embodiment, the mounting means is selected from the group consisting of (i) a magnetic layer on the back surface of the conformable glass sheet, (ii) an adhesive layer on the back surface of the conformable glass sheet, (iii) a static cling layer on the back surface of the conformable glass sheet, and (iv) a fabric fastener layer on the back surface of the conformable glass sheet.

In another embodiment, the mounting means is selected from the group consisting of (i) one or more mounting holes formed in the conformable glass sheet, (ii) one or more glass sheet hanging elements attached to the conformable glass sheet, and (iii) one or more glass sheet framing elements attached to the conformable glass sheet.

In one embodiment, the conformable writable erasable device further includes a decoration formed on or located adjacent to the back surface of the conformable glass sheet, the decoration being visible through the front surface of the conformable glass sheet.

In one embodiment, the glass sheet is elastically deformed into the select non-flat shape, and wherein the mounting means retains the glass in the select non-flat shape.

In one embodiment, the glass sheet is preformed into the select non-flat shape.

In a fourth aspect of the present invention, an apparatus having a writable erasable area includes an object having an object face with a select curved shape. The apparatus includes a conformable glass sheet having a front surface and a back surface, where the front face is opposed and parallel to the back surface, and the conformable glass sheet is conformable in shape to the object face. The apparatus further includes mounting means that mounts the conformable glass sheet on the object such that the conformable glass sheet is located on the object face and conforms in shape to the object face and such that the front surface of the conformable glass sheet is accessible and usable as the writable erasable area.

In one embodiment, the object is selected from the group consisting of a household appliance, a piece of furniture, an architectural element, and a non-glass board.

In one embodiment, the object is a refrigerator.

It is to be understood that both the foregoing general description and the following detailed description are exemplary of the present invention and are intended to provide an overview or framework for understanding the nature and character of the present invention as it is claimed. The accompanying drawings are included to provide a further understanding of the present invention and are incorporated in and constitute a part of this specification. The drawings illustrate various embodiments of the present invention and together with the description serve to explain the principles and operation of the present invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 2b shows a cross-section of a conformable glass sheet along line 2b-2b of FIG. 2a.

DETAILED DESCRIPTION

Figure 1:
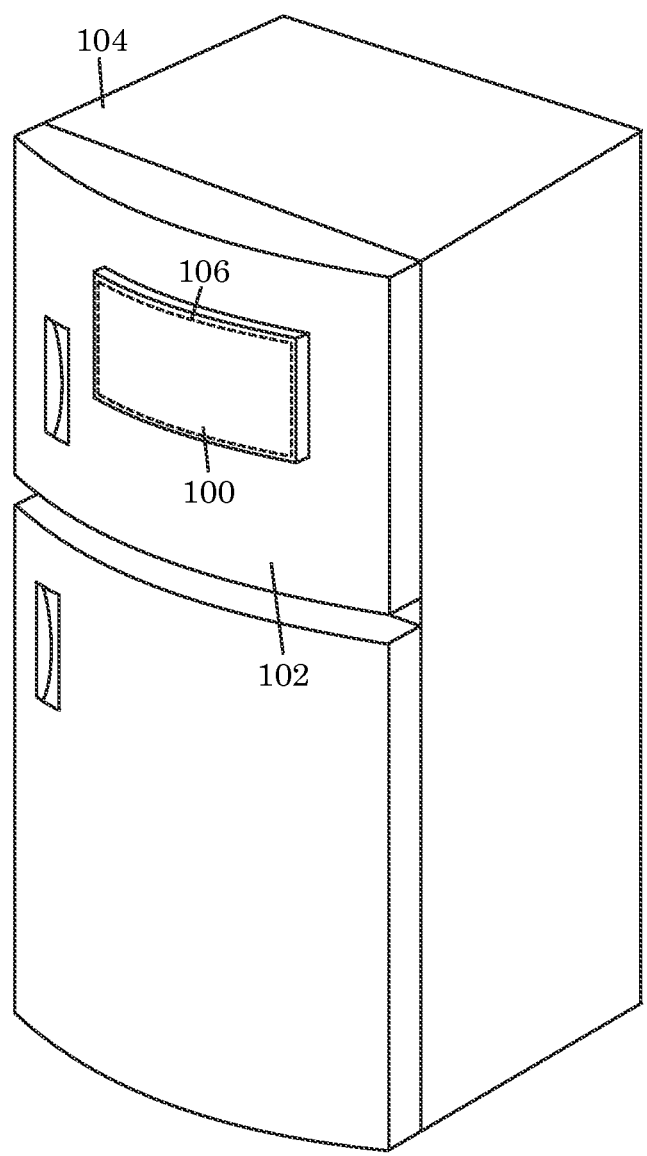
FIG. 1 shows a conformable writable erasable device mounted on a face of a refrigerator.

In the following detailed description, numerous specific details may be set forth in order to provide a thorough understanding of embodiments of the present invention. However, it will be clear to one skilled in the art when embodiments of the present invention may be practiced without some of these specific details. In other instances, well-known features or processes may not be described in detail so as to focus on what is novel and non-obvious about the present invention. In addition, like or identical reference numerals may be used to identify common or similar elements.

In FIG. 1, a conformable writable erasable device 100 is mounted on a face 102 of an object 104 to provide a writable erasable area 106 on the object face 102. The conformable writable erasable device 100 may be large enough to cover the entire object face 102 or may occupy only a selected area of the object face 102. Dry-erase or wet-erase markers can be used to write or draw on the writable erasable area 106. In general, the shape of the object face 102 or the selected area of the object face where the writable erasable area 106 is formed would be non-flat. Preferably, the non-flat shape is a curved shape. Alternatively, the non-flat shape may generally be a bent shape without sharp corners. In one embodiment, as shown in FIG. 1, the object face 102 is curved, and the conformable writable erasable device 100 conforms to the shape of the object face 102 to provide the writable erasable area 106. In the embodiment shown in FIG. 1, the object 102 is a refrigerator, and the object face 102 is located on a door of the refrigerator. However, the conformable writable erasable device 100 is not restricted to providing the writable erasable area 106 on a refrigerator object. In general, the object 102 can be any object having a face, and particularly an object that is expected to be both functional and decorative. In general, the object 102 may be selected from household appliances, e.g., a refrigerator or dishwasher, pieces of furniture, e.g., a cabinet or console, architectural elements, e.g., a glass window, and non-glass boards, e.g., a cork board, a chalkboard, a porcelain board, or a melamine board. The conformable writable erasable device 100 may be used to refurbish non-glass boards, for example. In general, the object face 102 may be a glass surface or a non-glass surface, such as a metallic or plastic surface.

The conformable writable erasable device 100 includes a conformable glass sheet and means for mounting the conformable glass sheet on the object 104 such that the conformable glass sheet is placed at a desired location on the object face 102 in order to provide the writeable erasable area 106 on the object face 102. The glass sheet is conformable due to being preformed in a select non-flat shape and/or due to its ability to be elastically deformed into a select non-flat shape. In one embodiment, the conformable glass sheet is a relatively flexible glass sheet, i.e., the glass sheet can be bent repeatedly within a predetermined range of bend angles without damage to the glass sheet. The flexibility of the glass sheet is partly due to the structural properties of the glass sheet and partly due to the thinness of the glass sheet. In another embodiment, the conformable glass sheet is a relatively rigid glass sheet, i.e., the glass sheet cannot be bent repeatedly within a predetermined range of bend angles without damage to the glass sheet.

Figure 2A:
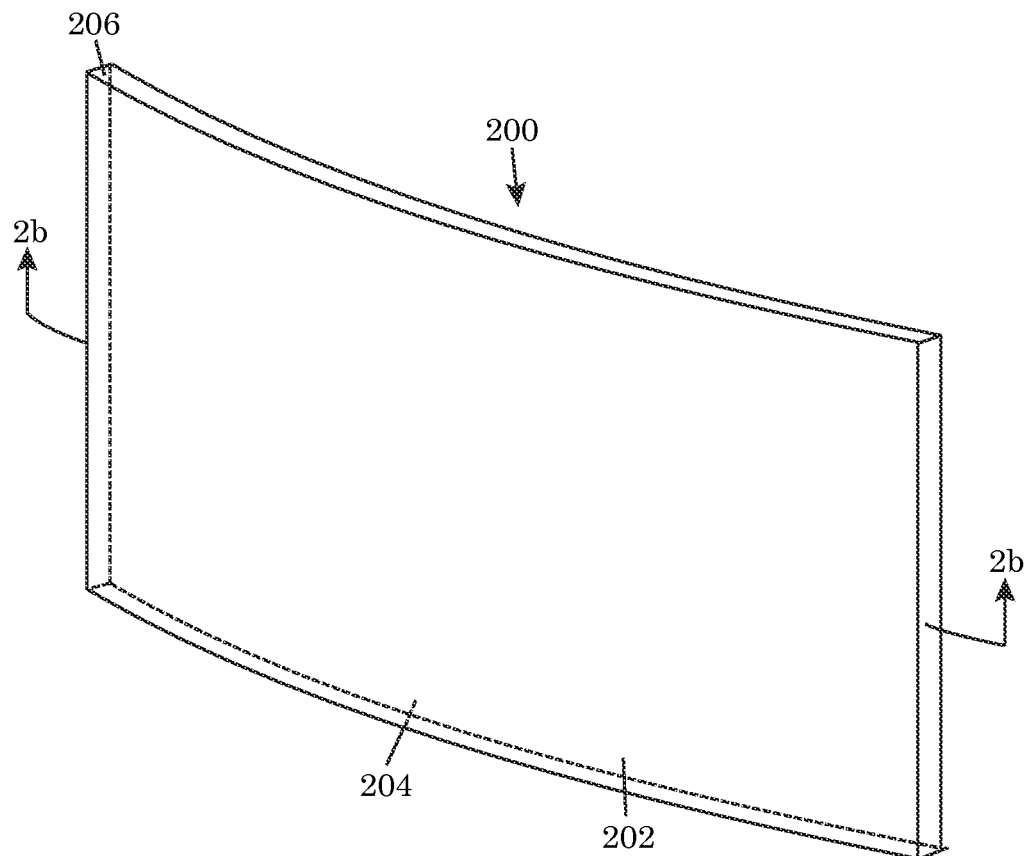
FIG. 2a shows a conformable glass sheet.

FIG. 2a shows a conformable glass sheet 200 having a front surface 202, a back surface 204, and a uniform thickness of glass 206 between the front surface 202 and the back surface 204. In one embodiment, the glass thickness 206 is less than 2.0 mm. In another embodiment, the glass thickness 206 is less than 1.0 mm. In yet another embodiment, the glass thickness 206 is less than 0.7 mm. Typically, the glass thickness 206 will not be less than 0.3 mm. In some embodiments, the glass thickness may be 2.0 mm or greater. In one embodiment, the conformable glass sheet 200 is a transparent glass sheet. In another embodiment, the conformable glass sheet 200 is a color tinted transparent glass sheet or a colored opaque glass sheet. In some embodiments, where the conformable glass sheet 200 is a transparent glass sheet, a decoration or printed image may be formed on the back surface 204 of the glass sheet 200. The decoration may be dense enough to cover the back surface 204, and of an opaque color, such that the back surface 204 appears opaque.

The front surface 202 is the writable erasable surface and is the surface that would be in the fore when the conformable writable erasable device 100 (in FIG. 1) is mounted on an object face. The front surface 202 may or may not have special surface attributes compared to the back surface 204. In some embodiments, the front surface 202 may be treated with agents that would facilitate surface writing and erasability. The back surface 204 is parallel and in opposing relation to the front surface 202. In the embodiment shown in FIG. 2a, the conformable glass sheet 200 is formed in a bent or bowed shape, such that the front and back surfaces 202, 204 are curved. Typically, the shape of the front and back surfaces 202, 204 will depend on the shape of the object face area where the conformable writable erasable device 100 would be mounted. For example, the conformable glass sheet 200 may be bent such that the back surface 204 has a shape that conforms to the shape of the object face area on which it is to be mounted.

Figure 2B:
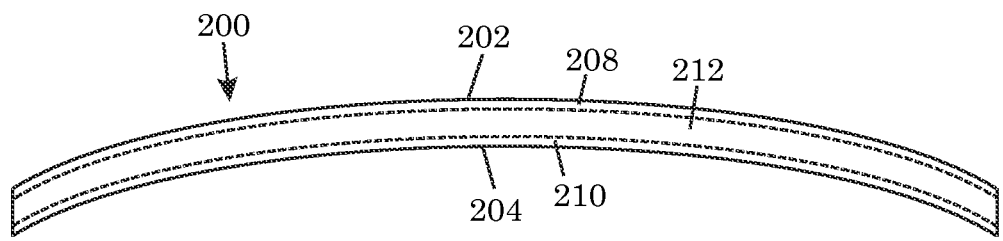

The conformable glass sheet 200 has at least one near-surface compressively-stressed region. FIG. 2b shows that the conformable glass sheet 200 may have a compressively-stressed region 208 near its front surface 202 and/or a compressively stressed region 210 near its back surface 204. In a preferred embodiment, the compressively-stressed region 208 (or 210) is formed by subjecting a "virgin glass" to a chemical strengthening process, preferably an ion-exchange process. Here, a "virgin glass" is a glass that has not been subjected to a chemical strengthening process. Although the preferred method for forming the compressively-stressed region 208 (or 210) is chemical strengthening, in some embodiments, thermal strengthening, such as tempering, may be used to form the compressively-stressed region 208 (or 210).

For the ion-exchange process, the virgin glass is an ion-exchangeable glass containing small alkali metal or alkaline-earth metal ions that can be exchanged for larger alkali or alkaline-earth metal ions. The ion-exchange takes place in a molten bath containing the larger alkali or alkaline-earth metal ions. The virgin glass is dipped or immersed in the molten bath, and the smaller alkali or alkaline-earth metal ions in the virgin glass are displaced by the larger alkali or alkaline-earth metal ions in the molten bath. The larger ions occupying sites in the glass previously occupied by the smaller ions create the compressively-stressed region in the glass. The ion-exchange occurs through the surface(s) of the glass. The depth of the ion-exchange into the glass determines the depth into the glass (or thickness, or layer depth) of the compressively-stressed region.

In one embodiment, a compressive stress of the compressively-stressed region 208 (or 210) is at least 300 MPa. Here, the "compressive stress of the compressively-stressed region" may be the highest or average or median compressive stress in the compressively-stressed region. The preceding may also be expressed as the conformable glass sheet having a surface compressive strength of at least 300 MPa. In some embodiments, the compressive stress of the compressively-stressed region 208 (or 210) is at least 300 MPa, or least 400 MPa, or at least 500 MPa, or at least 600 MPa. The compressive stress of the compressively-stressed region 208 (or 210) will generally be a function of glass composition and layer depth of the compressively-stressed region into the glass. Preferably, the layer depth of the compressively-stressed region 208 (or 210) is at least 20 microns. For any given glass composition, this layer depth can be controlled to an extent by the conditions of the strengthening process, preferably ion-exchange process, used in forming the compressively-stressed region. In some embodiments, the layer depth of the compressively-stressed region 208 (210) is at least 20 microns, or at least 25 microns, or at least 30 microns, or at least 35 microns, or at least 40 microns, or at least 45 microns, or at least 50 microns.

The conformable glass sheet 200 with the compressively-stressed region 208 (and/or 210) preferably has a central tensile-stressed region 212 with a tensile stress of at least 40 MPa. Here, the "tensile stress of the tensile-stressed region" may be the highest or average or median tensile stress in the tensile-stressed region. The preceding may also be expressed as the conformable glass sheet having an internal tensile strength of at least 40 MPa. In some embodiments, the tensile stress may be greater than 40 MPa, or greater than 45 MPa, or greater than 50 MPa, but less than 65 MPa, or less than 60 MPa, or less than 55 MPa. The tensile-stressed region will generally occupy the region of the glass not occupied by the compressively-stressed region 208 (and/or 210). The tensile-stressed region 212 is formed at the same time that the compressively-stressed region 208 (and/or 210) is formed, i.e., when compression is created in one region of the glass, tension is created in another region of the glass adjacent to the compressed region. Example glass compositions for the conformable glass sheet and example methods of forming the conformable glass sheet will be described further below.

Figure 2C:
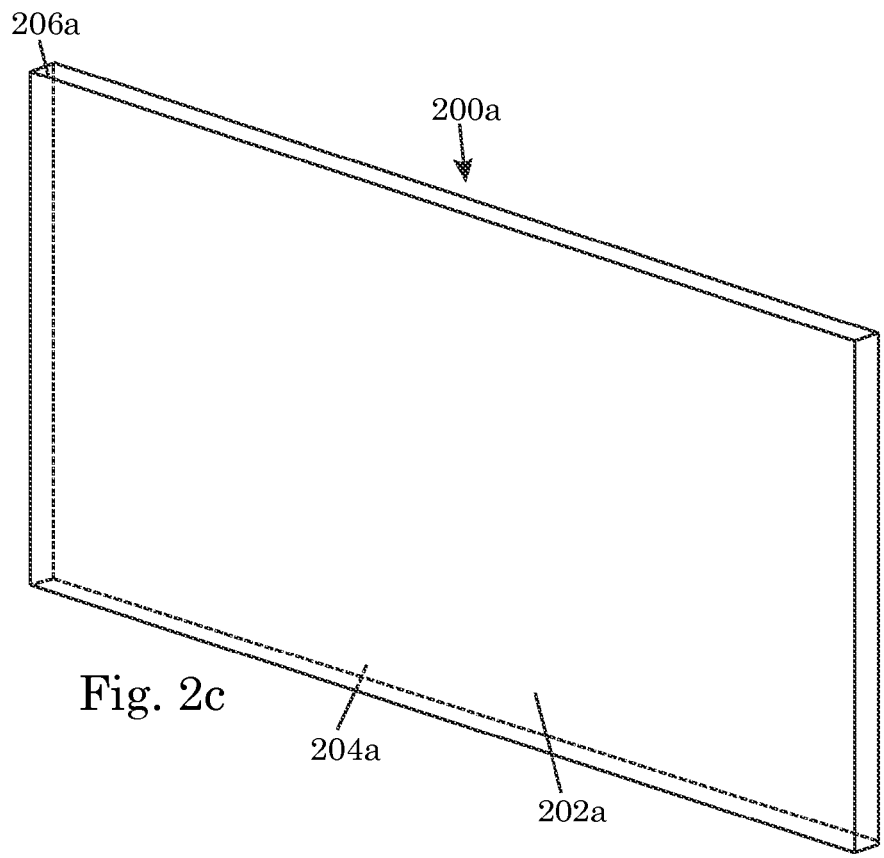
FIG. 2c shows a conformable glass sheet in flat form.

The conformable glass sheet 200 can be provided in a pre-shaped form, as shown in FIGS. 2a and 2b, or in a flat form, as shown in FIG. 2c. In the pre-shaped form, the conformable glass sheet 200 has been formed into a select shape, e.g., a curved shape, and holds its select shape without any external aid or retainer. The flat-form conformable glass sheet is flat in its equilibrium state. The flat-form conformable glass sheet can be formed into a select shape but cannot hold its select shape without an external aid or retainer. As will be further discussed below, a mounting means may be used to retain the shape of the conformable glass that cannot hold its select shape on its own. FIG. 2c shows a flat-form glass sheet 200a having a front surface 202a, a back surface 204a, and a glass thickness 206a between the surfaces 202a, 204a. Except for the difference noted between the flat-form conformable glass sheet and the pre-shaped conformable glass sheet above, the flat-form conformable glass sheet 200a has the same properties as the pre-shaped conformable glass sheet 200 of FIGS. 2a and 2b and can be substituted for the pre-shaped conformable glass sheet 200 in the conformable writable erasable device 100.

Figure 3:
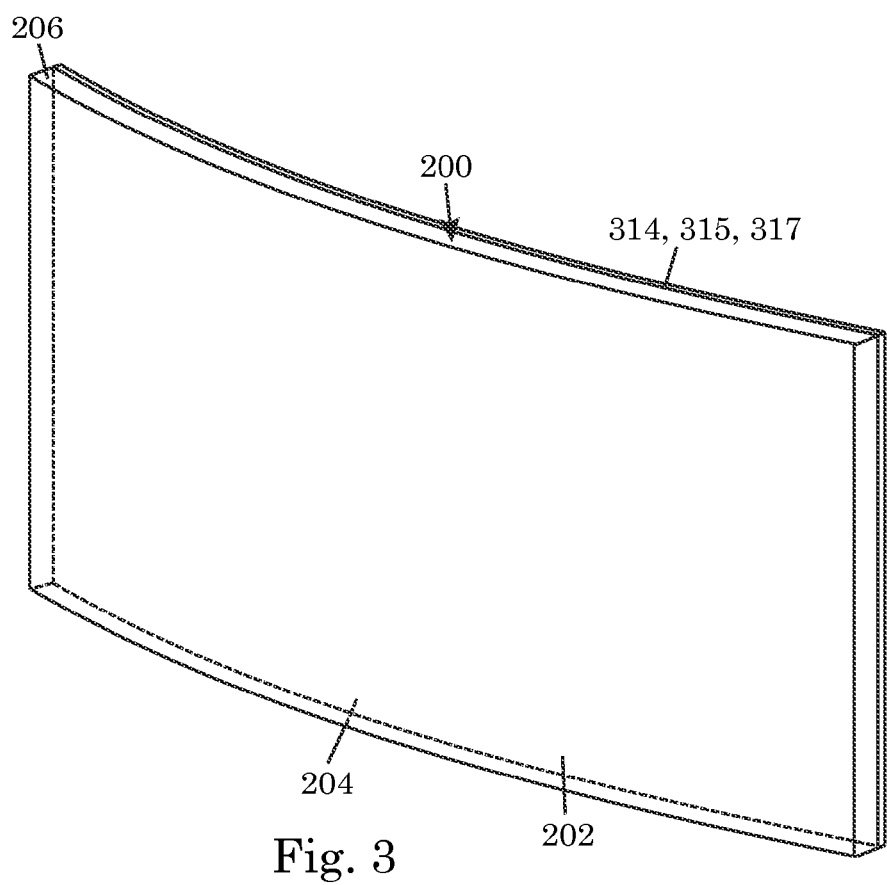
FIG. 3 shows a conformable glass sheet with mounting means at its back surface.

As mentioned earlier, the conformable writable erasable device 100 (in FIG. 1 includes mounting means for mounting the conformable glass sheet 200 to an object. The mounting means can take on a variety of forms. For example, in one embodiment, as shown in FIG. 3, the mounting means may be an adhesive layer 314 applied to the back surface 204 of the conformable glass sheet 200. The adhesive layer 314 may be a sticky adhesive with paper backing to protect the sticky surface of the adhesive, and the paper backing may be removed just before the conformable glass sheet 200 is mounted on an object face. Alternatively, the adhesive layer 314 may be a thermally-activated or UV-activated adhesive. The adhesive layer is preferably flexible so that it can conform to the conformable glass sheet 200 or bend with the conformable glass sheet, particularly in the case of the flat-form conformable glass sheet, as needed. The adhesive layer 314 may be optically clear so that the object face area where the conformable writable erasable device 100 is mounted is visible through the adhesive layer 314 and conformable glass sheet 200. Alternatively, the adhesive layer 314 may be a color tinted transparent adhesive or a colored opaque adhesive. Alternatively, the mounting means may be a static cling layer 315 applied to the back surface 204. Alternatively, the mounting means may be a fabric fastener 317 such as velcro, where the fabric fastener may be adhered to the back surface 204 using any suitable means such as adhesive.

Figure 4:
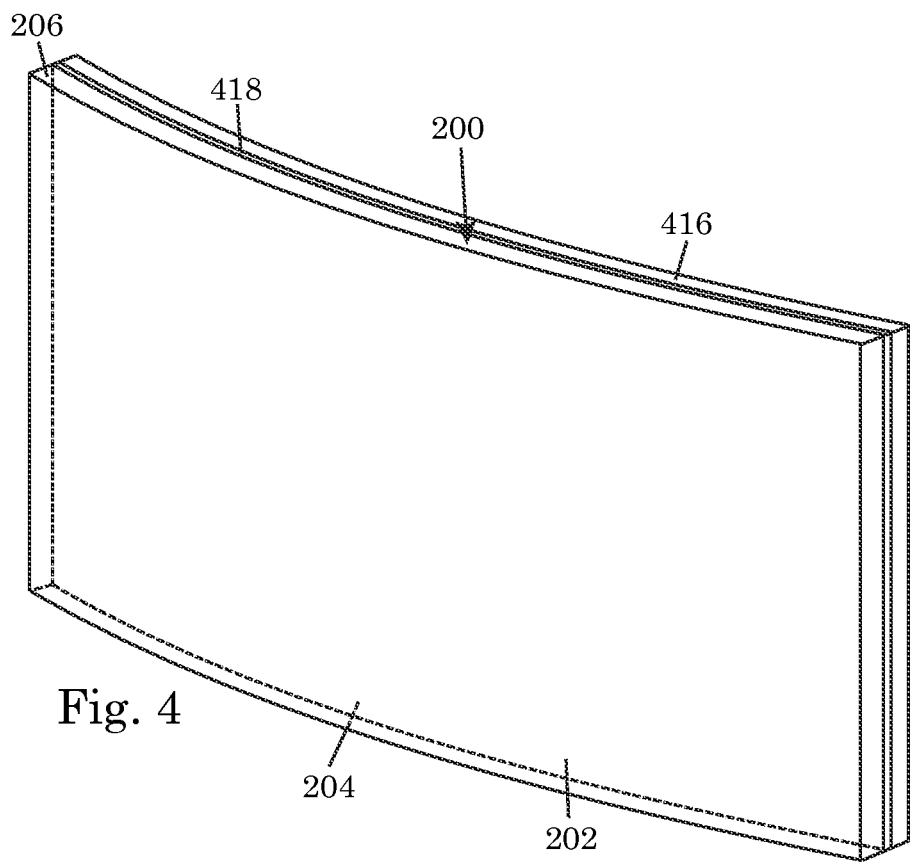
FIG. 4 shows a magnetic conformable glass sheet.

In another embodiment, as shown in FIG. 4, the mounting means may be a magnetic layer 416 applied to the back surface 204 of the conformable glass sheet 200. The magnetic layer 416 may be applied using any suitable means, such as an adhesive layer 418. The magnetic layer 416 may cover the entire back surface 204 or may be provided just at selected portions of the back surface 204, such as along a periphery of the back surface 204. The magnetic layer 416 would allow the conformable writable erasable device 100 (in FIG. 1) to be mounted on any metallic surface. The magnetic layer 416 is preferably provided in flexible form so that it can be shaped to conform to the back surface 204 of the conformable glass sheet 200 or so that it can be elastically bent together with the conformable glass sheet 200. In the former case, the back surface 204 has a select non-flat shape that conforms to the object face where the conformable writable erasable device is to be mounted. In the latter case, the magnetic layer 416 and conformable glass sheet 200 are elastically bent to a select non-flat shape that conforms to the object face where the conformable writable erasable device is to be mounted. The magnetic layer 416 may be provided in sheet form or in strip form. The magnetic layer 416 may be provided as a single piece of magnetic material or as multiple pieces of magnetic material.

Figure 5A:
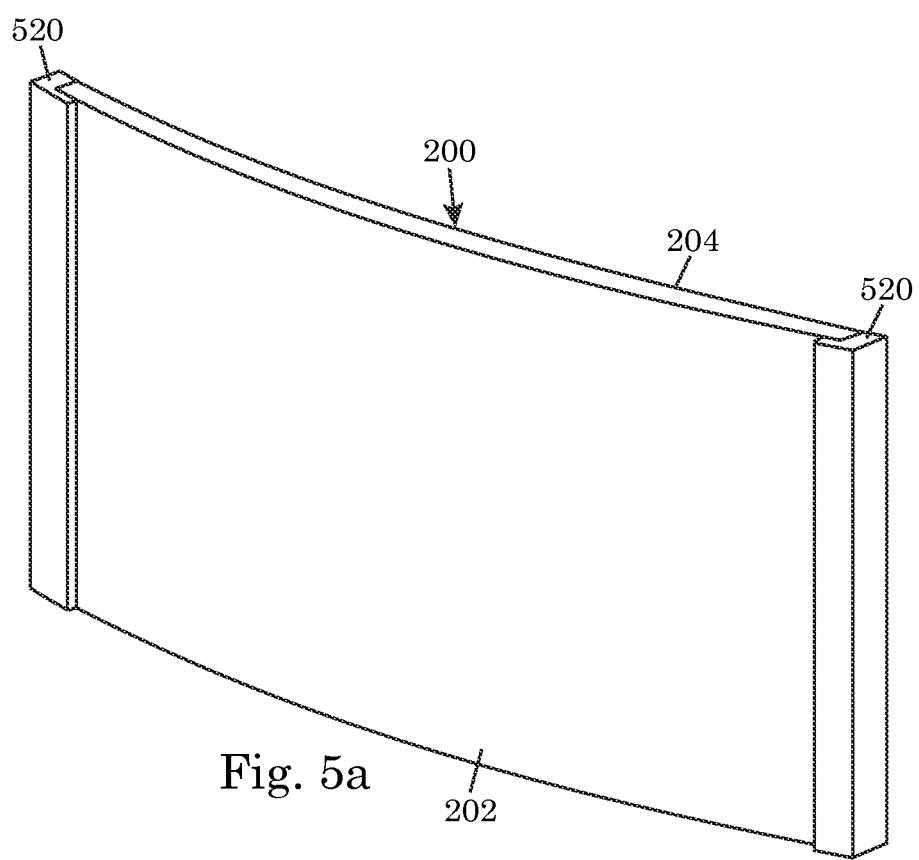
FIG. 5a shows a framed conformable glass sheet.
Figure 5B:
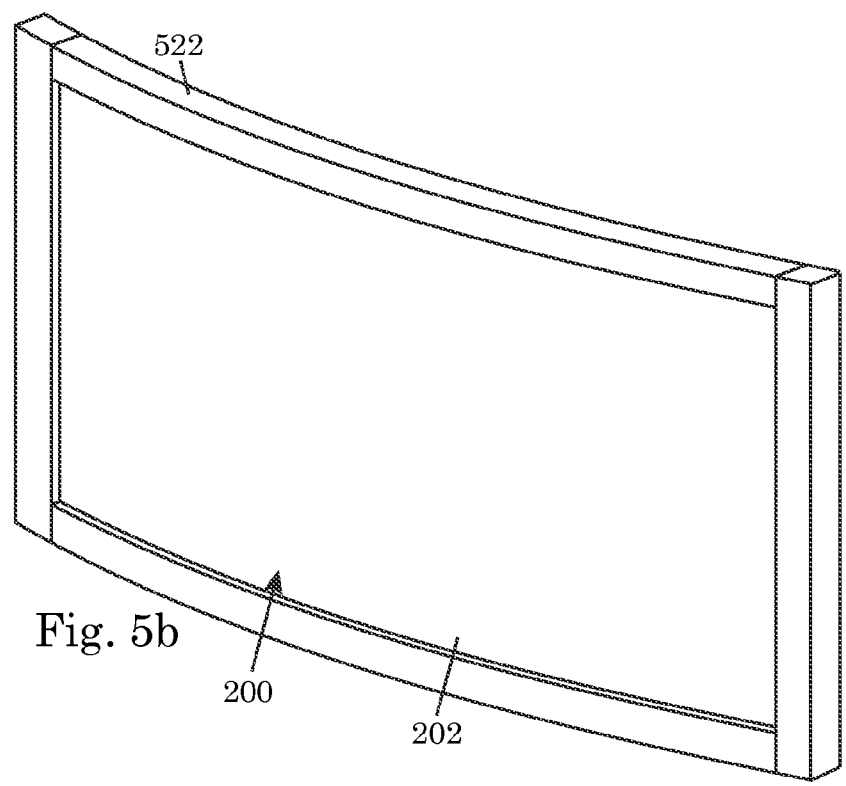
FIG. 5b shows another framed conformable glass sheet.

In another embodiment, the mounting means may be a frame, e.g., frame 520 in FIG. 5a or frame 522 in FIG. 5b. The frame may be a single-piece frame or a multi-piece frame. The frame may engage some edges of the conformable glass sheet, e.g., frame 520 in FIG. 5a, or may engage all the edges of the conformable glass sheet, e.g., frame 522 in FIG. 5b. After the frame engages the edges of the conformable glass sheet, it can be mounted on an object face to locate the conformable glass sheet on a selected area of the object face and thereby form a writable erasable area on the object face. The frame may be hung on or attached to the object face. FIG. 5a (5b) shows that the frame 520 (522) and conformable glass sheet 200 both form a non-flat shape. This would allow both the frame and conformable glass sheet to conform to an object face or selected area of the object face having the non-flat shape. The frame may be used with a pre-shaped conformable glass sheet 200 (in FIGS. 2a, 5a, and 5b) or with a flat-form conformable glass sheet 200a (in FIG. 2c). The frame may be made of a flexible, semi-flexible or semi-rigid, or rigid material.

The frame can be pre-shaped such that when it engages the edges of a pre-shaped conformable glass sheet its shape follows that of the pre-shaped conformable glass sheet, as shown in FIGS. 5a and 5b where the shape of the frames 520, 522 follows the shape of the pre-shaped conformable glass sheet 200. When the pre-shaped frame and pre-shaped conformable glass sheet are mounted on an object face, both the pre-shaped frame and pre-shaped conformable glass sheet will conform in shape to the object face. Alternatively, for a flat-form conformable glass sheet (e.g., 200a in FIG. 2c), the frame may initially be flat. After the frame engages the edges of the flat-form conformable glass sheet, the frame and the flat-form conformable glass sheet can be elastically deformed into a non-flat shape. In this case, the frame may retain the conformable glass sheet in its non-flat shape. This means that the frame should have the ability to flex and then retain its shape in the flexed position. For this purpose, the frame may be made of a semi-flexible or semi-rigid material.

Figure 6:
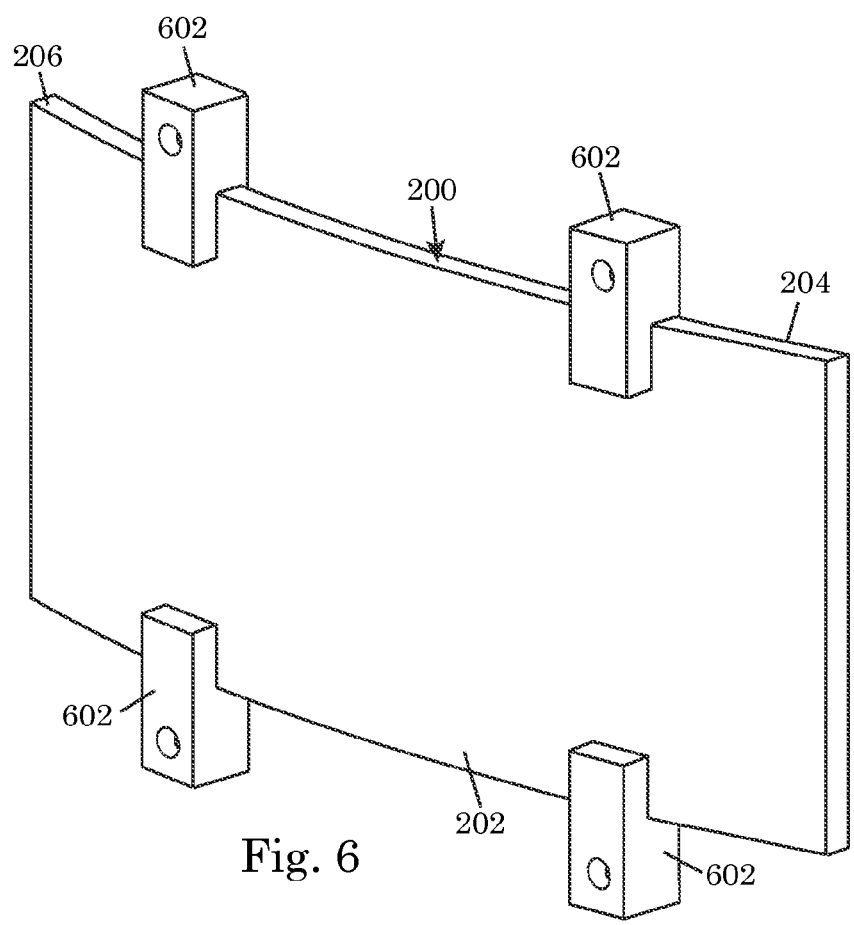
FIG. 6 shows a conformable glass sheet with glass sheet hanging elements.

In another embodiment, the mounting means may be hanging elements such as hanging clips that can be attached to the edges or corners of the conformable glass sheet. Exemplary hanging elements 602 are shown in FIG. 6. The hanging elements may be adhesive-backed or may have holes for mounting them to a surface using fasteners such as screws.

Figure 7:
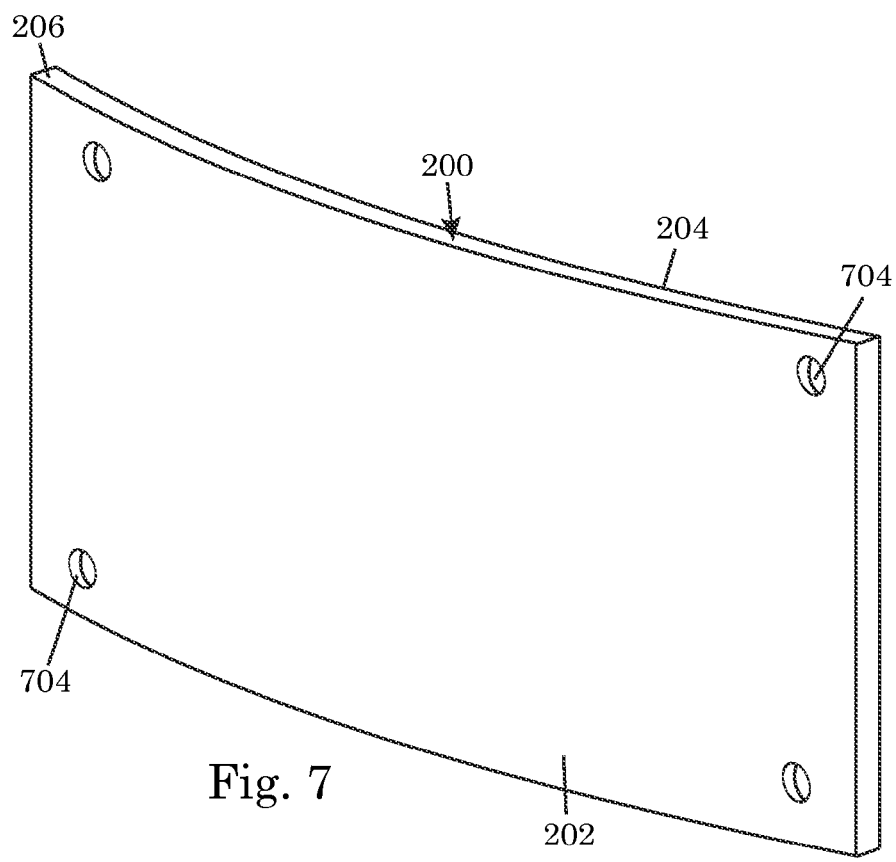
FIG. 7 shows a conformable glass sheet with mounting holes.

In another embodiment, mounting holes, e.g., mounting holes 704 in FIG. 7, are formed in the conformable glass sheet 200, typically through the thickness of the conformable glass sheet 200. Fasteners such as bolts or screws may be inserted into the holes in the conformable glass sheet 200 and corresponding holes in the object face to mount the conformable writable erasable device 100 (in FIG. 1) on the object face. The fasteners preferably include relatively large heads or washers in order to spread the contact force of the fastener against the glass sheet over a relatively large area and decrease the risk of fracturing the glass sheet In general, any means of hanging glass sheets on a wall or panel may be used as means for mounting the pre-shaped conformable glass sheet 200 (in FIG. 2a) or the flat-form conformable glass sheet 200a1 (in FIG. 2c), after being elastically deformed into a non-flat shape, on an object face. The mounting means may be selected so as to be removable if needed.

Figure 8:
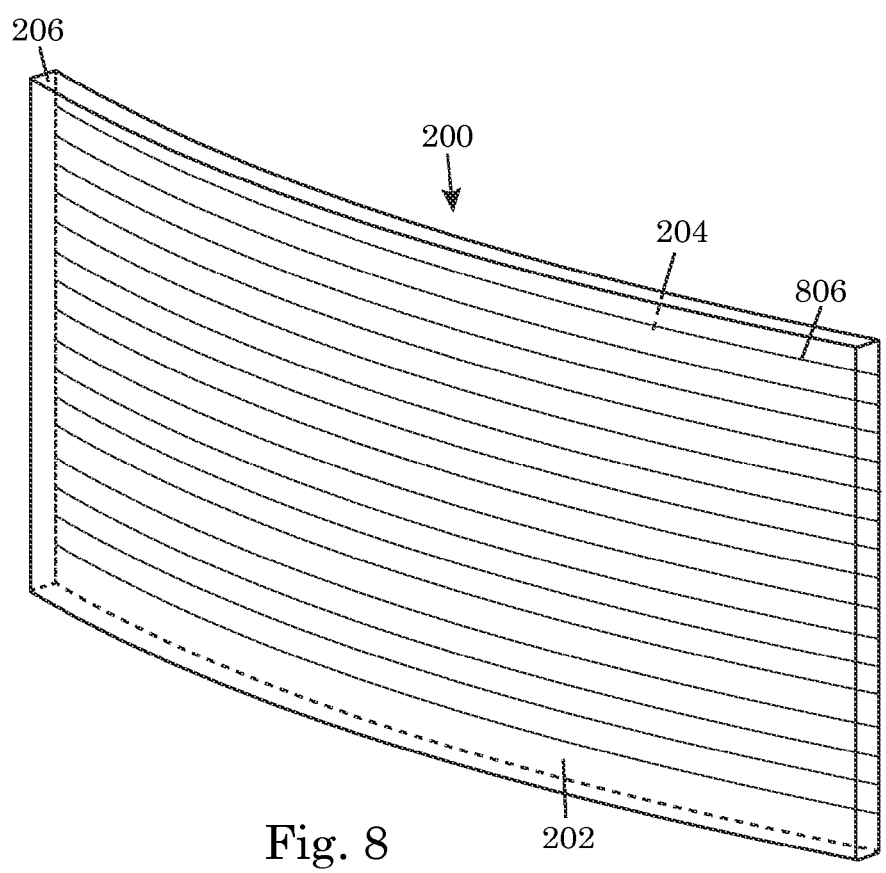
FIG. 8 shows a conformable glass sheet with a decoration on its back surface.

A decoration may be formed on the back surface 204 of the conformable glass sheet, as shown at 806 in FIG. 8. The decoration may be purely ornamental or both ornamental and functional. A functional decoration may be, for example, lines or grids to guide writing or drawing, a blank calendar, a background mimicking a cork board, or a background mimicking a sports field, or some other activity background. In another embodiment, the decoration may be an image or a photograph. The decoration may be formed on the back surface 204 using film deposition techniques such as screen printing or may be adhered to the back surface 204 using any suitable means such as adhesive or static cling. Alternatively, the decoration can be provided on or in a mounting means 314, 315, 317, 416, 418 (in FIGS. 3 and 4) at the back surface 204. The decoration may alternatively be provided on an additional sheet of material located between a mounting means 314, 315, 317, 416, 418 and the back surface 204 of the glass sheet.

A method of making a conformable writable erasable device as described above includes selecting a glass sheet having a front surface, and a back surface, where the front surface is opposed and parallel to the back surface. Preferably, the glass sheet has a thickness less than 2.0 mm. The method may include the step of forming the glass sheet into a select non-flat shape. This can involve providing the glass sheet in flat form and then using thermal reforming to form the glass sheet into a select non-flat shape. Before forming the glass sheet into a select non-flat shape, an area of an object face where the conformable writable erasable device would be mounted may be determined. Then, the select non-flat shape of the glass sheet may be based on the shape of the object face area. Typically, the select non-flat shape of the glass sheet will conform to the shape of the object face area. In typical embodiments, the select non-flat shape is a curved shape. For the thermal reforming, a mold may be prepared having the select non-flat shape. Then, the glass sheet can be heated to its softening temperature and sagged or pressed into or against the mold to form the select non-flat shape in the glass sheet. After forming the glass sheet into the desired shape, machining processes may be used to trim the edges of the glass sheet to the desired size, and the glass sheet may be chemically hardened.

The method may include forming a near-surface compressively-stressed region and a central tensile region in the glass sheet. The properties of the compressively-stressed region and central tensile region have already been described above. In a preferred embodiment, these regions are formed in the glass sheet by ion-exchange. This requires that the glass sheet is made of an ion-exchangeable glass. Examples of ion-exchangeable glasses that can be made with the properties described above for the conformable glass sheet can be found in the patent literature, e.g., U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997), and are also available from Corning Incorporated under the trade name GORILLA® glass. Typically, these ion-exchangeable glasses are alkali-aluminosilicate glasses or alkali-aluminoborosilicate glasses.

One example of an ion-exchangeable glass suitable for production of the conformable glass sheet includes $SiO_2$, $B_2O_3$ and $Na_2O$, where $(SiO_2+B_2O_3) \geq 66$ mol %, and $Na_2O \geq 9$ mol %. In one embodiment, the alkali-aluminoborosilicate glass includes at least 6 weight % $Al_2O_3$. In a further embodiment, the alkali-aluminoborosilicate glass includes one or more alkaline-earth oxides such that a content of alkaline-earth oxides is at least 5 weight %. The alkali-aluminoborosilicate glass may further include at least one of $K_2O$, MgO, and CaO. In one particular embodiment, the alkali-aluminoborosilicate glass includes:

61-75 mol % $SiO_2$,
7-15 mol % $Al_2O_3$,
0-12 mol % $B_2O_3$,
9-21 mol % $Na_2O$,
0-4 mol % $K_2O$,
0-7 mol % MgO, and
0-3 mol % CaO.

Another example of an ion-exchangeable glass suitable for production of the conformable glass sheet includes:

60-70 mol % $SiO_2$,
6-14 mol % $Al_2O_3$,
0-15 mol % $B_2O_3$,
0-15 mole% $Li_2O$, 0-20 mol % $Na_2O$,
0-10 mol % $K_2O$,
0-8 mol % MgO,
0-10 mol % CaO,
0-5 mol % $ZrO_2$,
0-1 mol % $SnO_2$,
0-1 mol % $CeO_2$,
<50 ppm $As_2O_3$, and
<50 ppm $Sb_2O_3$,
where 12 mol %≤($Li_2O$ +$Na_2O$ +$K_2O$)≤20 mol % and 0 mol %≤(MgO+CaO)≤10 mol %.

Another example of an ion-exchangeable glass suitable for production of the conformable glass sheet includes:
63.5-66.5 mol % $SiO_2$,
8-12 mol % $Al_2O_3$,
0-3 mol % $B_2O_3$,
0-5 mol % $Li_2O$,
8-18 mol % $Na_2O$,
0-5 mol % $K_2O$,
1-7 mol % MgO,
0-2.5 mol % CaO,
0-3 mol % $ZrO_2$,
0.05-0.25 mol % $SnO_2$,
0.05-0.5 mol % $CeO_2$,
<50 ppm $As_2O_3$, and
<50 ppm $Sb_2O_3$,
where 14 mol % <($Li_2O$+$Na_2O$+$K_2O$)≤18 mol % and 2 mol %≤(MgO+CaO)≤7 mol %.

Another example of an ion-exchangeable glass suitable for production of the conformable glass sheet includes alumina, at least one alkali metal, and one of (i) greater than 50 mol % $SiO_2$, (ii) at least 58 mol % $SiO_2$, (iii) at least 60 mol % $SiO_2$, where the ratio of $\alpha/\beta>1$, where $\alpha=Al_2O_3+B_2O_3$ and $\oplus$=sum of alkali metal oxides, where $\alpha$ and $\beta$ are expressed in mol %. This glass, in particular embodiments, includes:
58-72 mol % $SiO_2$,
9-17 mol % $Al_2O_3$,
2-12 mol % $B_2O_3$,
8-16 mol % $Na_2O$, and
0-4 mol % $K_2O$,
where the ratio $\alpha/\beta>1$.

Another example of an ion-exchangeable glass suitable for production of the conformable glass sheet includes:
61-75 mol % $SiO_2$,
7-15 mol % $Al_2O_3$,
0-12 mol % $B_2O_3$,
9-21 mol % $Na_2O$,
0-4 mol % $K_2O$,
0-7 mol % MgO, and
0-3 mol % CaO.

Another example of an ion-exchangeable glass suitable for production of the conformable glass sheet includes:
60-70 mol % $SiO_2$,
6-14 mol % $Al_2O_3$,
0-15 mol % $B_2O_3$,
0-15 mol % $Li_2O$,
0-20 mol % $Na_2O$,
0-10 mol % $K_2O$,
0-8 mol % MgO,
0-10 mol % CaO,
0-5 mol % $ZrO_2$,
0-1 mol % $SnO_2$,
0-1 mol % $CeO_2$,
less than 50 ppm $As_2O_3$, and
less than 50 ppm $Sb_2O_3$,
where 12 mol %≤$Li_2O$+$Na_2O$+$K_2O$≤20 mol % and 0 mol %≤MgO+CaO≤10 mol %.

Another example of an ion-exchangeable glass suitable for production of the conformable glass sheet includes:
64-68 mol % $SiO_2$,
12-16 mol % $Na_2O$,
8-12 mol % $Al_2O_3$,
0-3 mol % $B_2O_3$,
2-5 mol % $K_2O$,
4-6 mol % MgO, and
0-5 mol % CaO,
wherein: 66 mol %≤$SiO_2$+$B_2O_3$+CaO≤69 mol %; $Na_2O$+$K_2O$+$B_2O_3$+MgO+CaO+SrO>10 mol %, 5 mol %≤MgO+CaO+SrO≤8 mol %, ($Na_2O$+$B_2O_3$)−$Al_2O_3$≤2 mol %, 2 mol %≤$Na_2O$—$Al_2O_3$≤6 mol %, and 4 mol %≤($Na_2O$+$K_2O$)—$Al_2O_3$≤10 mol %.

The examples of ion-exchangeable glasses given above may additionally include 0-2 mol % of at least one fining agent selected from a group including $Na_2SO_4$, NaCl, NaF, NaBr, $K_2SO_4$, KCl, KF, KBr, and $SnO_2$.

After chemical strengthening of the glass sheet, which by now is a conformable glass sheet, the glass sheet may be annealed and/or special coatings may be applied to the glass sheet.

The method includes adding means of mounting the glass sheet on an object face to the glass sheet such that when the glass sheet is mounted on the object face the front surface of the glass sheet is accessible and usable for writing. Various mounting means are possible, as already described above.

The method may include forming a decoration on the back surface of the glass sheet either by printing the decoration on the back surface or by adhering a printed image on the back surface or on a mounting means that is adhered or otherwise attached to the back surface of the glass sheet.

To form a writable erasable area on an object face, a conformable glass sheet, e.g., conformable glass sheet 200 or 200a, is selected. Then, an area of the object face where the writable erasable area is to be located is selected. The shape of the conformable glass sheet is conformed to the shape of the selected area of the object face. This conforming may involve elastically deforming the conformable glass sheet into a select non-flat shape if the conformable glass sheet is in flat-form, e.g., conformable glass sheet 200a. If the conformable glass sheet has been pre-shaped, e.g., conformable glass sheet 200, then conforming may be as simple as locating the conformable glass sheet in the selected area, where the conformable glass sheet then automatically assumes the shape of the selected area. The conformable glass sheet is then mounted such that it is located at the selected area and, if necessary, elastically conforms in shape to the selected area. Any of the mounting means mentioned above may be used to secure the glass sheet in place on the selected area in its conforming shape.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of forming a glass sheet on an object, comprising:
(a) selecting a glass sheet having a front surface and a back surface, the front surface being opposed to and parallel to the back surface;
(b) selecting an area of the object where the glass sheet is to be located;

(c) conforming a shape of the glass sheet to the area of the object; and
(d) mounting the glass sheet on the object such that the glass sheet is located at the selected area of the object and conforms in shape to the selected area of the object.

2. The method of claim 1, wherein step (a) comprises selecting the glass sheet having a thickness selected from the group consisting of less than 2.0 mm, less than 1.0 mm, and less than 0.7 mm.

3. The method of claim 1, wherein step (a) comprises selecting the glass sheet having a thickness less than 2.0 mm and a surface compression strength of at least 300 MPa.

4. The method of claim 1, wherein step (a) comprises selecting the glass sheet having a compressively-stressed region near at least one of the front and back surfaces, wherein the compressively-stressed region has a layer depth of at least 20 microns.

5. The method of claim 4, wherein step (a) comprises selecting the glass sheet in which the compressively-stressed region is formed by a chemical strengthening process.

6. The method of claim 1, further comprising:
(e) selecting a mounting means from the group consisting of (i) a magnetic layer applied on the back surface of the glass sheet, (ii) an adhesive layer applied on the back surface of the glass sheet, and (iii) a static cling layer applied on the back surface of the glass sheet;
wherein step (d) comprises using the selected mounting means to mount the glass sheet on the object.

7. The method of claim 1, further comprising:
(e) selecting a mounting means from the group consisting of (i) one or more mounting holes in the glass sheet and one or more fasteners insertable in the mounting holes and object, (ii) one or more glass sheet hanging elements attachable to the glass sheet and object, and (iii) one or more glass sheet framing elements attachable to the glass sheet and object;
wherein step (d) comprises using the selected mounting means to mount the conformable glass sheet on the object.

8. The method of claim 1, further comprising:
(e) placing a decoration on or adjacent to the back surface of the glass sheet, wherein the decoration is visible through the front surface of the glass sheet.

9. The method of claim 1, further comprising:
(e) selecting the object from the group consisting of a household appliance, a piece of furniture, an architectural element, and a non-glass board.

10. The method of claim 1, wherein in step (b), the selected area of the object has a curved shape.

11. An apparatus comprising:
an object having an object face with a predefined shape;
a conformable glass sheet having a front surface and a back surface, the front surface being opposed and parallel to the back surface, the conformable glass sheet being conformable in shape to the object face; and
mounting means that mounts the conformable glass sheet on the object such that the conformable glass sheet is located on the object face and conforms in shape to the object face.

12. The apparatus of claim 11, wherein the conformable glass sheet is usable as a writable erasable area.

13. The apparatus of claim 11, wherein the conformable glass sheet has a thickness less than 2.0 mm and a surface compressive strength of at least 300 MPa.

14. The apparatus of claim 13, wherein the conformable glass sheet has at least one compressively-stressed region near the front surface or the back surface, and wherein the compressively-stressed region has a layer depth of at least 20 microns.

15. The apparatus of claim 11, wherein the conformable glass sheet has a thickness that is selected from the group consisting of less than 2.0 mm, less than 1.0 mm, and less than 0.7 mm.

16. The apparatus of claim 11, wherein the mounting means is selected from the group consisting of (i) a magnetic layer on the back surface of the conformable glass sheet, (ii) an adhesive layer on the back surface of the conformable glass sheet, and (iii) a static cling layer on the back surface of the conformable glass sheet.

17. The apparatus of claim 11, wherein the mounting means is selected from the group consisting of (i) one or more mounting holes formed in the conformable glass sheet, (ii) one or more glass sheet hanging elements attached to the conformable glass sheet, and (iii) one or more glass sheet framing elements attached to the conformable glass sheet.

18. The apparatus of claim 11, further comprising a decoration formed on or located adjacent to the back surface of the conformable glass sheet, the decoration being visible through the front surface of the conformable glass sheet.

19. The apparatus of claim 11, wherein the glass sheet is preformed into the predefined shape.

20. The apparatus of claim 11, wherein the object is selected from the group consisting of a household appliance, a piece of furniture, an architectural element, and a non-glass board.

* * * * *